United States Patent [19]
Kolstad et al.

[11] 4,121,777
[45] Oct. 24, 1978

[54] MOBILE TREE REMOVING APPARATUS

[76] Inventors: Richard M. Kolstad, Rte. 2; Robert V. Anderson, Box 66, Hwy. 60 East, both of, St. James, Minn. 56081

[21] Appl. No.: 833,575

[22] Filed: Sep. 15, 1977

[51] Int. Cl.² .............................................. B02C 4/30
[52] U.S. Cl. ..................................... 241/58; 144/2 N; 144/30; 144/34 R; 241/101.7; 241/235
[58] Field of Search ....................... 241/58, 101.7, 235, 241/283; 144/2 N, 30, 34 R, 34 B, 208 K

[56] References Cited
U.S. PATENT DOCUMENTS

| 1,530,654 | 3/1925 | Daley ..................................... 241/58 |
| 2,588,903 | 3/1952 | Akins ................................... 144/30 X |
| 3,472,298 | 10/1969 | Vinogradov et al. ........... 241/283 X |
| 3,727,653 | 4/1973 | Tycek ............................. 144/34 R X |
| 3,785,415 | 1/1974 | Taponen ................... 144/34 |
| 3,955,765 | 5/1976 | Gaitten .............................. 241/101.7 |

FOREIGN PATENT DOCUMENTS 381,387 8/1973 U.S.S.R. .................................. 241/235

Primary Examiner—Howard N. Goldberg
Attorney, Agent, or Firm—Williamson, Bains, Moore & Hansen

[57] ABSTRACT

A mobile tree removing apparatus includes an elongate extensible and retractable boom structure mounted on a vehicle such as a truck. A cutting device is mounted on the outer end of the boom structure and includes a housing having a plurality of cutting members positioned therein. Adjacent cutting members cooperate with each other to cut an entire standing tree including the trunk and limbs thereof into chips. The chips are impelled through a conduit connected to the housing by action of a vacuum pump mounted on a truck.

5 Claims, 2 Drawing Figures

MOBILE TREE REMOVING APPARATUS

SUMMARY OF THE INVENTION

This invention relates to a mobile tree removing apparatus and more particularly to a boom mounted cutting device mounted on a vehicle which cuts an entire standing tree into chips.

An object of this invention is to provide a novel tree removal apparatus which is operable to cut the limbs and trunks of a standing tree into chips and to simultaneously collect the chips as the tree is being cut.

More specifically, it is an object of this invention to provide a mobile tree removing apparatus including an extensible and retractable boom structure having a cutting device adjustably mounted thereon, the latter having grinding blades which cut the limbs and trunk of a standing tree into chips, the chips being impelled through a conduit connected to the cutting device by the action of a vacuum pump connected to the conduit.

These and other objects and advantages of this invention will more fully appear from the foregoing description made in connection with the accompanying drawings, wherein like reference characters refer to the same or similar parts throughout the several views.

FIGURES OF THE DRAWINGS

DESCRIPTION OF THE PREFERRED EMBODIMENT OF THE INVENTION

Figure 1:
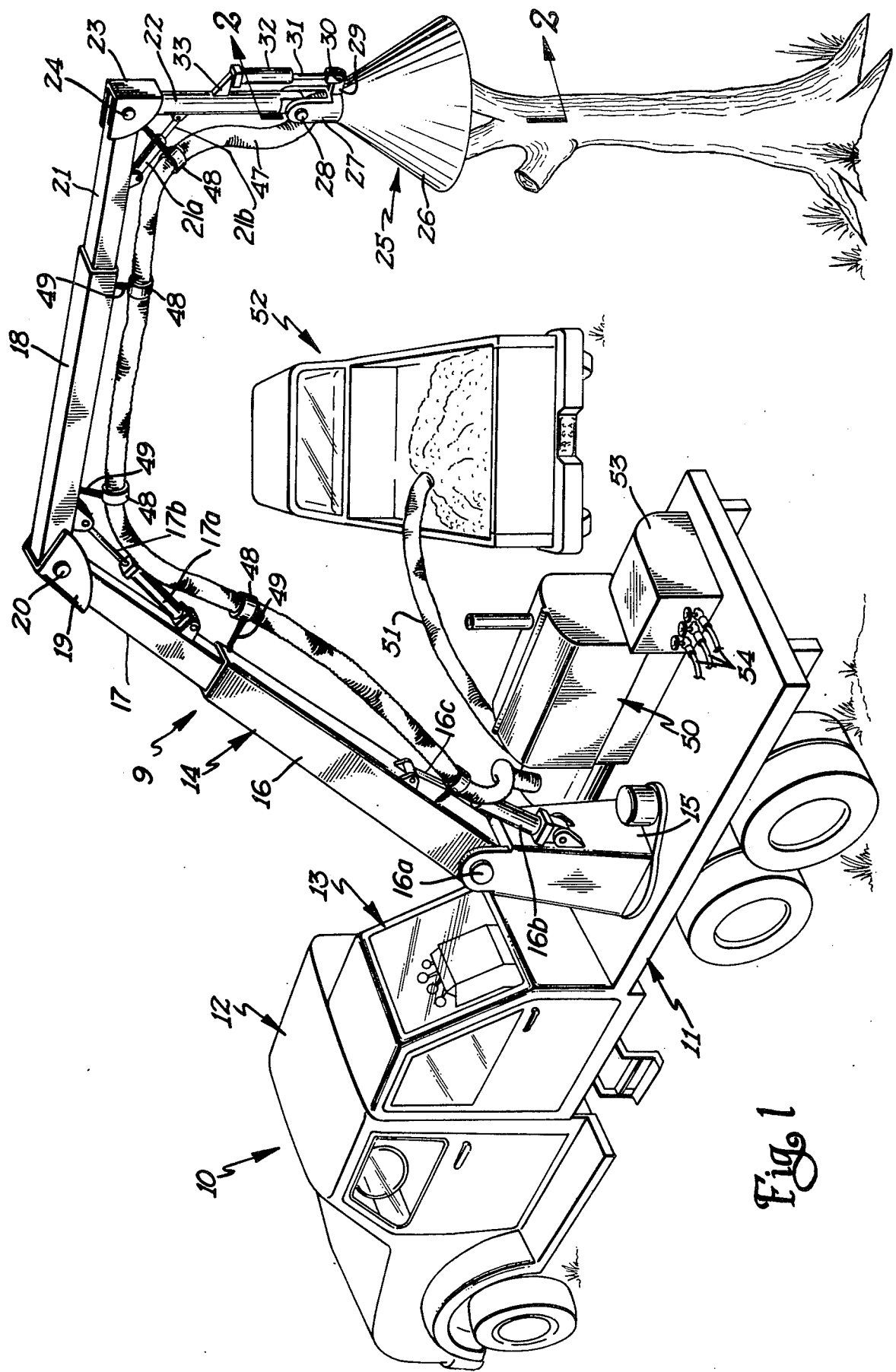
FIG. 1 is a perspective view of the novel tree removing apparatus.

Referring now to the drawings and more particularly to FIG. 1, it will be seen that the novel tree removing apparatus, designated generally by the reference numeral 9, is thereshown. The tree removing apparatus 9 includes a truck 10 having a bed 11 and having a conventional cab 12. The truck is also provided with a rearwardly facing safety cab 13 which contains the controls for operating the boom structure 14 and operating the cutting device, which will be described herein below.

The boom structure 14 is mounted on the bed 11 and includes a base 15 which projects upwardly from the bed. The boom structure 14 is of sectional construction and includes a boom section 16 which is pivotally connected by pivot 16a to the base to permit vertically swinging movement of the boom section 16 relative to the base. A cylinder 16b is pivotally connected to the base 15 and has a piston moveable therein to which is connected piston rod 16c. Piston rod 16c is connected to boom section 16. Extension and retraction of piston rod 16c causes vertical swinging movement of boom 16. A boom section 17 is telescopically positioned within the boom section 16 and is extensible and retractable relative thereto. A boom section 18 is pivotally connected to the outer or upper end of boom section 17 by means of a bracket 19 and pivot 20 to permit vertical swinging movement of the boom section 18 relative to the section 17. A cylinder 17a is mounted on section 17 and has a piston moveable therein to which is connected piston rod 17b. The piston is connected to boom section 18 whereby extension and retraction of the piston rod produces swinging movement of boom section 18 relative to boom section 17.

A boom section 21 is telescopically positioned within the boom section 18 and is extensible and retractable relative thereto. An outer boom section 22 is pivotally connected to the outer end of boom section 21 by means of a bracket 23 and a pivot 24 to permit vertical swinging movement of the section 22 relative to the section 21. A cylinder 21a is mounted on boom section 21 and has a piston moveable therein to which is connected piston rod 21b. Piston rod 21b is connected to boom section 22. Extension and retraction of piston rod 21b causes pivoting movement between boom sections 21 and 22. Extension and retraction of the telescoping sections is accomplished by hydraulic cylinders positioned within the larger of the telescoping boom sections in a well known manner.

A cutting device 25 is adjustably mounted on the outer end of the boom section 22 and includes a housing 26. The housing 26 is provided with a pair of spaced apart brackets 27 which are pivotally connected to the outer end of the boom section 22 by a pivot 28 to permit relative swinging movement therebetween. One of the brackets 27 is provided with an ear 29 which projects outwardly therefrom which is connected by a pivot 30 to the outer end of a piston rod 31. Piston rod 31 is connected to a piston positioned within a hydraulic cylinder 32, the latter secured to the boom section 22 by means of a bracket 33. Extension and retraction of the piston rod 31 produces swinging movement of the cutting device relative to the boom section 22.

Figure 2:
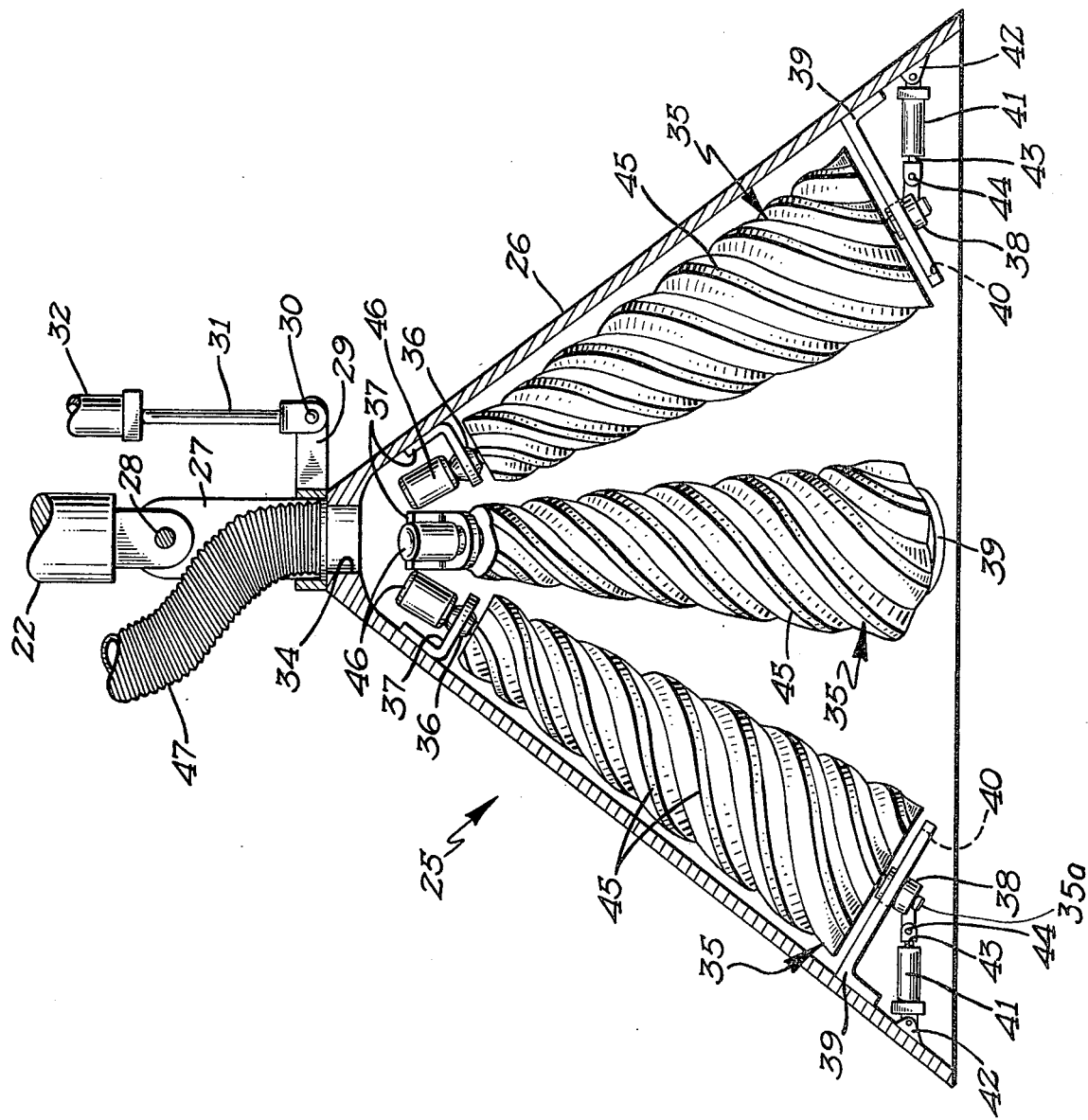
FIG. 2 is a cross-sectional view taken approximately along line 2—2 of FIG. 1 and looking in the direction of the arrows.

Referring now to FIG. 2, it will be seen that the housing 26 is of generally frusto-conical configuration and has an opening 34 in its upper or reduced end. A plurality of similar frusto-conical revolvable cutting members 35 each having a shaft 35a are revolvably mounted within the housing 26 for rotation relative thereto. The upper end of each shaft 35a for each cutting member 35 journaled in a bearing 36 mounted in one of a plurality of similar upper angle brackets 37. It will be noted that the angle brackets 37 are secured to the inner surface of the housing 26 adjacent the opening 34.

The lower end of the shaft 35a of each cutting member 35 is journaled in a bearing 38 which is mounted in one of a plurality of lower angle brackets 39. The angle brackets 39 are also secured to the inner surface of the housing 26 and each has a slot 40 therein in which bearing 38 is slidable. A plurality of spaced apart hydraulic cylinders are each secured to the inner surface of the housing 26 by a bracket 42 and each hydraulic cylinder has a piston movable therein to which is connected a piston rod 43. The outer end of the piston rod 43 is connected by a pivot 44 to one of the bearings 38 whereby upon extension and retraction of the piston rod 43 for each cylinder 41, the associated bearing 38 will be shifted in the slot of the associated angle bracket 39. With this arrangement, the spacing between adjacent cutting members 35 may be variously adjusted.

The cutting members 35 are provided with a helical or spiral blade 45 and each cutting member is driven by one of a plurality of rotary hydraulic motors 46. It will be noted that the spacing between adjacent cutting members 35 tapers in an upward direction and therefore diverges in a downward direction. With this arrangement, adjacent cutting members cooperate with each other to cut limbs and trunks of trees into chips and to convey the cut chips in an upward direction toward the opening 34.

Means are provided for continuously removing the cut chips from the housing, and this means includes an elongate flexible conduit 47 which has one end thereof connected to the upper end of the housing 26 to communicate with the opening 34 therethrough. The elongate flexible conduit is provided with a plurality of ring supports 48 each being secured by resilient elements 49 to one of the boom sections of the boom structure 14. The lower end of the flexible conduit is connected to a vacuum pump 50 so that the chips are constantly entrained in the vacuum or stream of negative pressure and are removed from the housing 26. The vacuum pump 50 is also provided with an outlet conduit 51 on the pressure side of the pump, the outlet conduit directing the cut chips to any kind of receptacle, such as the body of the truck 52. The bed 11 is also provided with a hydraulic pump and reservoir unit 53 having conduits 54 connected thereto which are connected to the various hydraulic cylinders for extending and retracting the telescoping sections of the boom structure and for producing swinging movement between pivotally connected boom sections. The conduits also provide power for the hydraulic motors for shifting the cutting mechanism relative to the boom section 22 and for operating the cutting members 35.

In operation, the truck 10 will be positioned closely adjacent the tree to be removed and the boom structure 14 will be actuated to position the cutting device 25 in a position so that the cutting members 35 will engage the limbs of the trees. The limbs of the tree will be rapidly cut by the revolving cutting members to reduce the limbs to chips which are carried through the flexible conduit and directed into a suitable receptacle such as the truck body of the truck 52. The limbs can be reduced to chips regardless of the angular position of the housing and cutter members carried thereby could be adjusted to accommodate and directly engage any limb. Further, by adjusting the spacing between adjacent cutting members, various sized limbs as well as various sized trunks may be readily cut by the cutting device. After the limbs have been reduced to chips, the cutting device will be applied to the tree trunk. Three or more cutting members will be normally employed in a cutting device although it is possible to utilize only two cutting members. The present apparatus permits standing trees to be reduced to chips, and permits the chips to be removed simultaneously with the cutting. The cutting operation to remove a relatively large tree involves only a period of a few minutes while removing all of the chips simultaneously with the chipping operation thereby obviating the conventional clean-up operation.

Thus it will be seen that I have provided a novel tree removing apparatus which is of relatively simple and inexpensive construction and operation, and which functions in a more efficient manner than any heretofore known comparable apparatus.

What is claimed is:

1. A mobile tree removing apparatus comprising: a vehicle,
    an elongate extensible and retractable boom structure mounted on said vehicle and including a plurality of elongate boom sections each having an outer end and an inner end, certain sections engaging the next adjacent section in telescoping relation and being longitudinally shiftable relative to each other, other boom sections being pivotally connected to the next adjacent section,
    a cutting device including a housing,
    means shiftably mounting said housing on the outer end of the outer section to permit shifting movement of the house relative to said outer section,
    revolvable cutter members in said housing for engaging and cutting the limbs and trunks of trees into chips,
    power means for revolving said cutter members,
    means defining an elongate conduit having one end thereof communicating with said housing,
    a vacuum pump connected to the other end of said conduit and being operable for removing chips from said housing through the conduit by means of a vacuum.

2. The apparatus as defined in claim 1 wherein said housing is of generally frusto-conical shaped configuration and is swingably mounted on the outer end of said outer section, power means for shifting said housing relative to said outer section.

3. The device as defined in claim 2 wherein said conduit means comprises an elongate, flexible, extensible and retractable conduit extending between and interconnecting said housing and said vacuum pump.

4. The device as defined in claim 2 wherein said cutter members are of elongate construction and each has a spiral cutting blade thereon.

5. The apparatus as defined in claim 2 wherein said cutter members are mounted within said housing for shifting movement relative thereto for adjusting the spacing between the adjacent cutter members.

* * * * *